US010156456B2

(12) United States Patent
Chen et al.

(10) Patent No.: US 10,156,456 B2
(45) Date of Patent: Dec. 18, 2018

(54) METHOD AND SYSTEM FOR DISPLAYING GEOGRAPHIC INFORMATION

(71) Applicant: Tencent Technology (Shenzhen) Company Limited, Shenzhen (CN)

(72) Inventors: Pinlin Chen, Shenzhen (CN); Yi Shan, Shenzhen (CN); Jun Wang, Shenzhen (CN); Junjie Zhou, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 7 days.

(21) Appl. No.: 15/210,499

(22) Filed: Jul. 14, 2016

(65) Prior Publication Data

US 2016/0320199 A1    Nov. 3, 2016

Related U.S. Application Data

(63) Continuation of application No. PCT/CN2015/070169, filed on Jan. 6, 2015.

(30) Foreign Application Priority Data

Jan. 24, 2014    (CN) .......................... 2014 1 0033756

(51) Int. Cl.
*G01C 21/36*    (2006.01)
*G01S 19/51*    (2010.01)
(Continued)

(52) U.S. Cl.
CPC ........... *G01C 21/362* (2013.01); *G01C 21/20* (2013.01); *G01C 21/3626* (2013.01);
(Continued)

(58) Field of Classification Search
None
See application file for complete search history.

(56) References Cited

U.S. PATENT DOCUMENTS

| 8,332,142 | B2 * | 12/2012 | Tanaka | ................. | G01C 21/362 |
| | | | | | 701/431 |
| 2008/0119176 | A1 * | 5/2008 | Chen | ...................... | G01C 21/20 |
| | | | | | 455/414.2 |

(Continued)

FOREIGN PATENT DOCUMENTS

| CN | 1950863 A | 4/2007 |
| CN | 101551253 A | 10/2009 |

(Continued)

OTHER PUBLICATIONS

Tencent Technology, ISRWO, PCT/CN2015/070169, Apr. 24, 2015, 8 pgs.

(Continued)

Primary Examiner — Rami Khatib
(74) Attorney, Agent, or Firm — Morgan, Lewis & Bockius LLP

(57) ABSTRACT

This application is directed to a geographic information display method. While a first mobile device is executing an instant messaging application, it obtains its own geographic location information, a second mobile device's geographic location information, and a first timestamp at which the geographic location information is recorded. The first mobile device then displays a map associated with the first timestamp on a user interface. The displayed map includes two marks that represent the locations of the first and second mobile devices, respectively, and instant messages exchanged between these two mobile devices are displayed on the map adjacent to the two marks. As the first mobile device obtains geographic location information in association with a second timestamp, it updates the displayed map (Continued)

to reflect variations of the locations of the mobile devices, while the mark corresponding to the first mobile device is displayed at a fixed location on the user interface.

18 Claims, 7 Drawing Sheets

(51) Int. Cl.

| | |
|---|---|
| *H04L 12/26* | (2006.01) |
| *H04L 12/58* | (2006.01) |
| *H04W 4/02* | (2018.01) |
| *H04W 4/12* | (2009.01) |
| *H04W 4/021* | (2018.01) |
| *G01C 21/20* | (2006.01) |

(52) U.S. Cl.
CPC ..... *G01C 21/3664* (2013.01); *G01C 21/3667* (2013.01); *G01C 21/3676* (2013.01); *G01S 19/51* (2013.01); *H04L 43/106* (2013.01); *H04L 51/046* (2013.01); *H04W 4/021* (2013.01); *H04W 4/027* (2013.01); *H04W 4/12* (2013.01)

(56) References Cited

U.S. PATENT DOCUMENTS

| | | | | |
|---|---|---|---|---|
| 2008/0268816 | A1* | 10/2008 | Wormald | H04L 67/24 |
| | | | | 455/412.2 |
| 2009/0156229 | A1* | 6/2009 | Hein | G01C 21/20 |
| | | | | 455/456.1 |
| 2013/0326366 | A1* | 12/2013 | Choi | H04W 4/02 |
| | | | | 715/752 |
| 2014/0066105 | A1* | 3/2014 | Bridge | H04L 65/1003 |
| | | | | 455/457 |
| 2015/0222584 | A1* | 8/2015 | Holliday | H04L 51/20 |
| | | | | 715/752 |
| 2016/0127486 | A1* | 5/2016 | Chen | G06F 3/04817 |
| | | | | 709/206 |
| 2016/0294958 | A1* | 10/2016 | Zhang | H04W 4/02 |

FOREIGN PATENT DOCUMENTS

| | | |
|---|---|---|
| CN | 101620804 A | 1/2010 |
| CN | 101720054 A | 6/2010 |
| CN | 101852619 A | 10/2010 |
| CN | 101903742 A | 12/2010 |
| CN | 103220207 A | 7/2013 |
| EP | 1939591 A2 | 7/2008 |
| JP | H 01161111 A | 6/1989 |
| JP | H 05108005 A | 4/1993 |
| JP | H 07159186 A | 6/1995 |
| JP | H 10222062 A | 8/1998 |
| JP | 2000331284 A | 11/2000 |

OTHER PUBLICATIONS

Tencent Technology, IPRP, PCT/CN2015/070169, Jul. 26, 2016, 5 pgs.

\* cited by examiner

METHOD AND SYSTEM FOR DISPLAYING GEOGRAPHIC INFORMATION

RELATED APPLICATION

This application is a continuation application of PCT Patent Application No. PCT/CN2015/070169, entitled "METHOD AND SYSTEM FOR DISPLAYING GEOGRAPHIC INFORMATION" filed on Jan. 6, 2015, which claims priority to Chinese Patent Application No. 201410033756.6, entitled "METHOD AND APPARATUS FOR DISPLAYING GEOGRAPHIC INFORMATION" filed on Jan. 24, 2014, both of which are incorporated by reference in their entirety.

TECHNICAL FIELD

The disclosed implementations relate generally to information technology, and in particular, to methods and systems for displaying geographic location information on a user interface of a mobile device.

BACKGROUND

Map applications are developed and used to provide navigation functions. Prior to and during the course of navigation, a user oftentimes performs certain user actions on a displayed map to obtain route information (e.g., remaining distance, turns, traffic conditions, and locations of rest areas). Therefore, there is a need to render the map in a more user friendly manner, and specifically, the map is preferably displayed with many interested information items and improved overall effects to satisfy various users' navigation needs.

Global Positioning System (GPS) technology is applied to identify a position of a mobile device. A map application is further used to display a map on a user interface of the mobile device, and mark the position of the mobile device as a circle or a bubble on the map. As the position varies with movement of the mobile device, a user of the mobile device could choose to preview the route ahead. Specifically, the mobile device detects a user action (e.g., a swipe) on the map displayed on the user interface, and thereby, adjusts the displayed area of the map on the user interface to allow the user to preview interested part of the map. Accordingly, the marked position of the mobile device shifts with the variation of the displayed area of the map, and sometimes, would move out of the displayed area. The user experience could be comprised as the marked position of the mobile device is not displayed on the mobile device. Based on this specific example, a need exists to accommodate both information previewing and position displaying on the user interface, such that better user experiences could be rendered for the map application on the mobile device.

SUMMARY

The above deficiencies and other problems associated with the conventional approaches for displaying geographic information are reduced or eliminated by the application disclosed below. In some embodiments, the application is implemented in a mobile device that has one or more processors, memory and one or more modules, programs or sets of instructions stored in the memory for performing multiple functions. Instructions for performing these functions may be included in a computer program product configured for execution by one or more processors.

One aspect of the application is a geographic information display method implemented at a first mobile device having one or more processors and memory storing programs for execution by the processors. The geographic information display method includes while executing an instant messaging application, obtaining first geographic location information of the first mobile device associated with a first user, second geographic location information of a second mobile device associated with a second user, and a first timestamp at which both the first and second geographic location information is recorded. The geographic information display method further includes displaying a map associated with the first timestamp. The map includes a first mark corresponding to the first mobile device at a first location defined by the first geographic location information and a second mark corresponding to the second mobile device at a second location defined by the second geographic location information, respectively. Instant messages exchanged between the first and second users are displayed on the map adjacent to the first and second marks, respectively. The geographic information display method further includes obtaining updated geographic location information of the first mobile device and the second mobile device, and a second timestamp at which the updated geographic location information is recorded. The method further includes updating the displayed map on the user interface to reflect variations of the geographic locations of the first and second mobile devices. The first mark corresponding to the first mobile device is at a fixed location on the user interface, and the second mark corresponding to the second mobile device is updated on the displayed map according to the updated geographic location information of the second mobile device.

Another aspect of the application is a mobile device that includes one or more processors, and memory having instructions stored thereon, which when executed by the one or more processors cause the processors to perform operations to implement the above method for displaying geographic information on a user interface associated with an instant messaging application that is implemented on the mobile device.

Another aspect of the application is a non-transitory computer-readable medium, having instructions stored thereon, which when executed by one or more processors cause the processors to perform operations to implement the above methods for displaying geographic information on a user interface associated with an instant messaging application that is implemented on the mobile device.

Various advantages of the present application would be apparent in light of the descriptions below.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

In order to more clearly describe the technical scheme of the embodiment of the present application, a brief introduction will be made to the accompanying drawings depicted in the description of the embodiments. Obviously, the accompanying drawings depicted below are only some of the embodiments of the present application. The ordinary skilled in the art will obtain other accompanying drawings according to these without the use of the creative effort.

Figure 1:
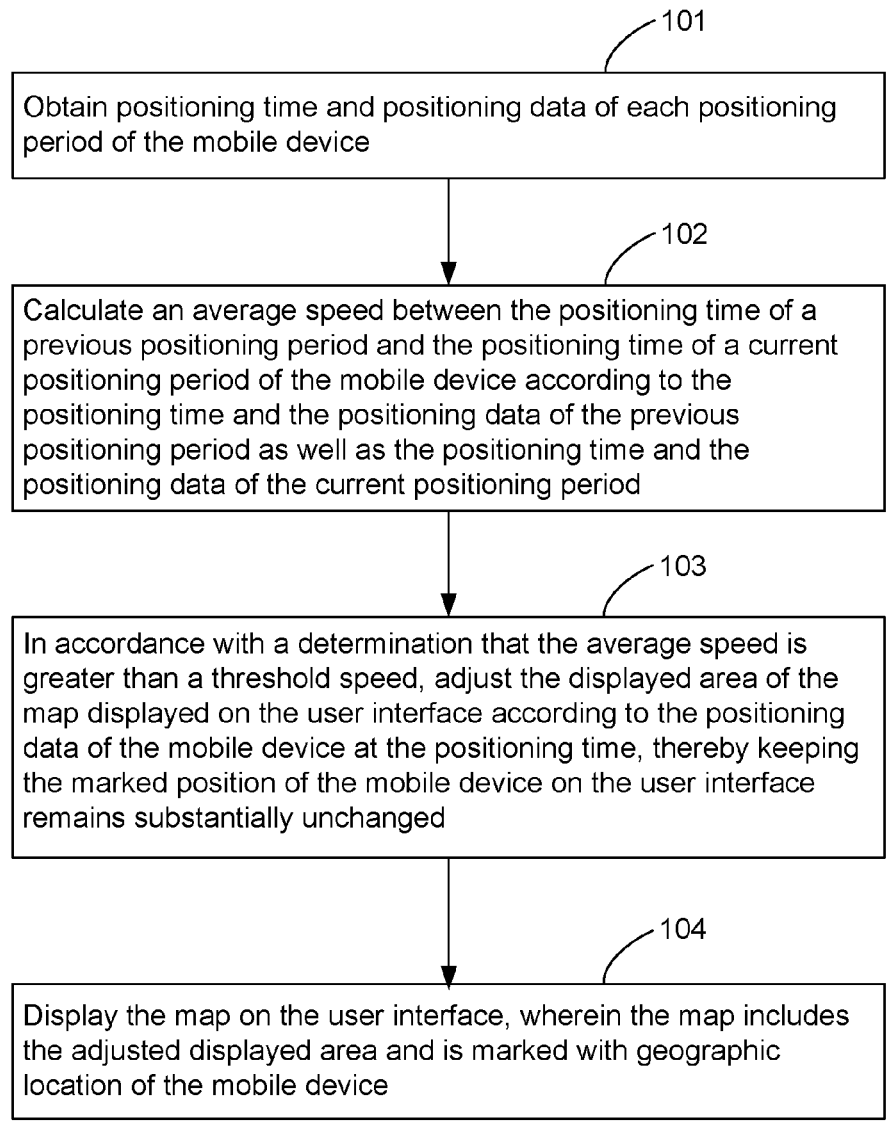
FIG. 1 is a flow chart of an exemplary geographic information display method in accordance with some embodiments.

The present application will be further described in detail by means of embodiments with reference to the drawings, in order to make the implementation, features and advantages of the present application more clear.

DETAILED DESCRIPTION

In order to make the objects, technical schemes and advantages of the present application more clear and apparent, embodiments of the present application will now be described in further detail with reference to accompanying drawings.

In accordance with various embodiments of the application, a geographic information display method is implemented at a mobile device (e.g., a first mobile device). The mobile device obtains first geographic location information and a first timestamp. The first geographic location information is associated with a first geographic location where the mobile device is located at a first time indicated by the first timestamp. The mobile device executes a geographic positioning application for displaying on a user interface a map associated with the first timestamp. The first geographic position of the mobile device is marked on the displayed map according to the first geographic location information. Then, the mobile device obtains second geographic location information and a second timestamp. The second geographic location information is associated with a second geographic location where the mobile device is located at a second time indicated by the second timestamp. The mobile device calculates an average speed of the mobile device based on the first and second geographic location information, and the first and second timestamps. In accordance with a determination that the average speed is higher than a threshold speed, the mobile device updates the displayed map on the user interface to reflect a variation of the geographic location of the mobile device, wherein the first and second geographic positions of the user are marked on a fixed location on the user interface.

In some implementations, the mobile device determines whether the user of the mobile device is browsing the displayed map (e.g., previewing route information). Further, in accordance with a determination that the user is browsing the displayed map, the displayed map is zoomed out to include both the geographic location of the mobile device and browsed map area on the same user interface. In this situation, the geographic location of the user is still marked on the fixed location of the user interface. However, in some implementations, the mobile device determines that the user of the mobile device is browsing the displayed map, and accordingly, forgoes updating the displayed map.

In some implementations, the geographic information display method is implemented on a social network platform (e.g., on an instant messaging application). A user logs onto a user account associated with the social network platform while the user is travelling between two locations and needs navigation service. A geographic display function is integrated into the social network platform. As a result of using the geographic display method in this application, a map is rendered to provide a better display effect based on the social network platform and thereby improves user experience with both social networking and navigation.

In some implementations, the geographic information display method further displaying and updating on the displayed map a geographic location of another mobile device (e.g., a second mobile device) controlled by another user. However, the geographic location of the second mobile device is not fixed. Specifically, the geographic location of the second mobile device is marked on the user interface according to the variation of the displayed map. Further, in some implementations, the users of the first and second mobile device are associated with each other on a social network application that displays the map on its user interface according to the geographic information method disclosed herein. In addition to displaying the geographic locations of the mobile devices, the social network application also displays other conversation information (e.g., text messages or links to voice messages) on the map, and specifically next to the marks representing the users of the mobile devices on the user interface.

FIG. 1 is a flow chart of an exemplary geographic information display method 100 in accordance with some embodiments. Method 100 is, optionally, governed by instructions that are stored in a non-transitory computer readable storage medium and that are executed by one or more processors of a mobile device (e.g., a global positioning system (GPS) device, a smart phone, a personal digital assistant (PDA), a tablet and a laptop computer). Each of the operations shown in FIG. 1 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 100 may be combined and/or the order of some operations may be changed.

The mobile device obtains (101) positioning time and positioning data of each positioning period of the mobile device. The positioning time is associated with a timestamp, and the positioning data include geographic location information of the mobile device at the positioning time. In some implementations, a mobile device includes a GPS module that captures the positioning data of the mobile device regularly (e.g., once in each predetermined positioning period). The mobile device thereby captures a plurality of positioning data items each associated with one positioning time and one positioning period. In some implementations, the mobile device displays a user interface that includes a map. A portion of the map is displayed on the user interface, and geographic locations of the mobile device are marked and updated on the displayed area of the map according to the positioning time and the positioning data.

The mobile device then calculates (102) an average speed between the positioning time of a previous positioning period and the positioning time of the current positioning period according to the positioning time and the positioning data of the previous positioning period as well as the positioning time and the positioning data of the current positioning period. Stated another way, the mobile device tracks the average speed by calculating geographic location information associated with two distinct instants associated with two timestamps. In some situations, these two distinct instants are two sequential position measurement times of the GPS.

Further, in accordance with a determination that the average speed is greater than a threshold speed, the mobile device adjusts (103) the displayed area of the map displayed on the user interface according to the positioning data of the mobile device at the positioning time, thereby keeping the marked position of the mobile device on the user interface remains substantially unchanged.

The mobile device then displays (104) the map on the user interface. The map includes the adjusted displayed area and is marked with geographic location of the mobile device.

According to the method provided by the embodiment, after the positioning time and the positioning data of each positioning period of the mobile device are acquired, the average speed between the positioning time of the previous positioning period and the positioning time of the current positioning period is calculated according to the positioning time and the positioning data of the previous positioning period as well as the positioning time and the positioning data of the current positioning period. And when the average speed is greater than the threshold speed, the map displayed area is adjusted according to the positioning data of the mobile device so as to keep the display position of the corresponding user identification of the mobile device on the user interface unchanged. Since the display position of the user identification is locked, the map displayed area can be adjusted without changing the display position of the user identification, thereby optimizing the display effect of the map.

In some embodiments, geographic information display method 100 further includes: prior to obtaining the positioning time and the positioning data of each positioning period of the mobile device, identifying geographic locations of the mobile device at a plurality of positioning periods by obtaining the positioning data and the positioning time associated with each of the positioning periods. In some embodiments, the positioning data include longitude and latitude data, i.e., geographic coordinates that specifies the east-west and south-north positions of the corresponding geographic location on the Earth's surface.

In some embodiments, operation 102 (i.e., calculating the average speed between the positioning time of the previous positioning period and the positioning time of the current positioning period of the mobile device according to the positioning time and the positioning data of the previous positioning period as well as the positioning time and the positioning data of the current positioning period) further includes:

calculating displacement of the mobile device according to the positioning data of the current positioning period and the positioning data of the previous positioning period;

calculating the time difference between the positioning time of the current positioning period and the positioning time of the previous positioning period; and calculating the average speed between the positioning time of the previous positioning period and the positioning time of the current positioning period of the mobile device according to the displacement and the time difference.

In some embodiments, prior to adjustment of the displayed area of the map according to the positioning data, the mobile device determines whether a user identification is labeled on the map on the user interface to indicate the geographic location of the mobile device. In some situations, the displayed area of the map is adjusted according to the positioning data of the mobile device, only when it is determined that the user identification is labeled on the map displayed on the user interface, In some embodiments, prior to adjustment of the displayed area of the map according to the positioning data, the mobile device determines whether the user is controlling the user interface to verify the geographic information displayed on the map. This situation occurs when the user is reviewing the map and the geographic information. The map is preferably not updated to allow the user to complete the ongoing review activity. In accordance with a determination that the user is not controlling the user interface to verify the geographic information displayed on the map, the mobile device performs operations 103 and 104 in which the displayed area of the map is adjusted and according to the positioning data and displayed on the user interface of the mobile device.

In some embodiments, the mobile device adjusts the displayed area of the map on the user interface based on a central point of the user interface. Specifically, operation 103 of adjusting the displayed area of the map further includes:

calculating coordinate offset values on the user interface for two geographic locations where the mobile device are located at a previous instant and a current instant, wherein the two geographic locations are associated with current positioning data and previous positioning data obtained at the previous and current instants, respectively, and these positioning data are used to calculate the coordinate offset values on the user interface;

obtaining coordinate values and coordinate offset values of a current central point displayed on the user interface at the current instant, and identifying where the subsequent central point associated with a subsequent instant is located on the user interface that is currently displayed, wherein the mobile device calculates coordinate values of the subsequent central point on the map that is currently displayed on the user interface; and using the subsequent central point of the displayed area as a reference point, and moving the current displayed area of the map according to the coordinate offset values of the current central point, until the location associated with the subsequent central point coincides with the central point of the user interface.

Any combination of all the above-mentioned optional technical schemes may be employed to form alternative embodiments of the present application, and thus will not be discussed in further detail here.

It should be understood that the particular order in which the operations in FIG. 1 have been described are merely exemplary and are not intended to indicate that the described order is the only order in which the operations could be performed. One of ordinary skill in the art would recognize various ways to displaying the geographic information of the mobile device as described herein. Additionally, it should be noted that details of other processes described below with respect to methods 200 and 700 (e.g., FIGS. 2 and 7) are also applicable in an analogous manner to method 100 described above with respect to FIG. 1. For brevity, these details are not repeated here.

Figure 2:
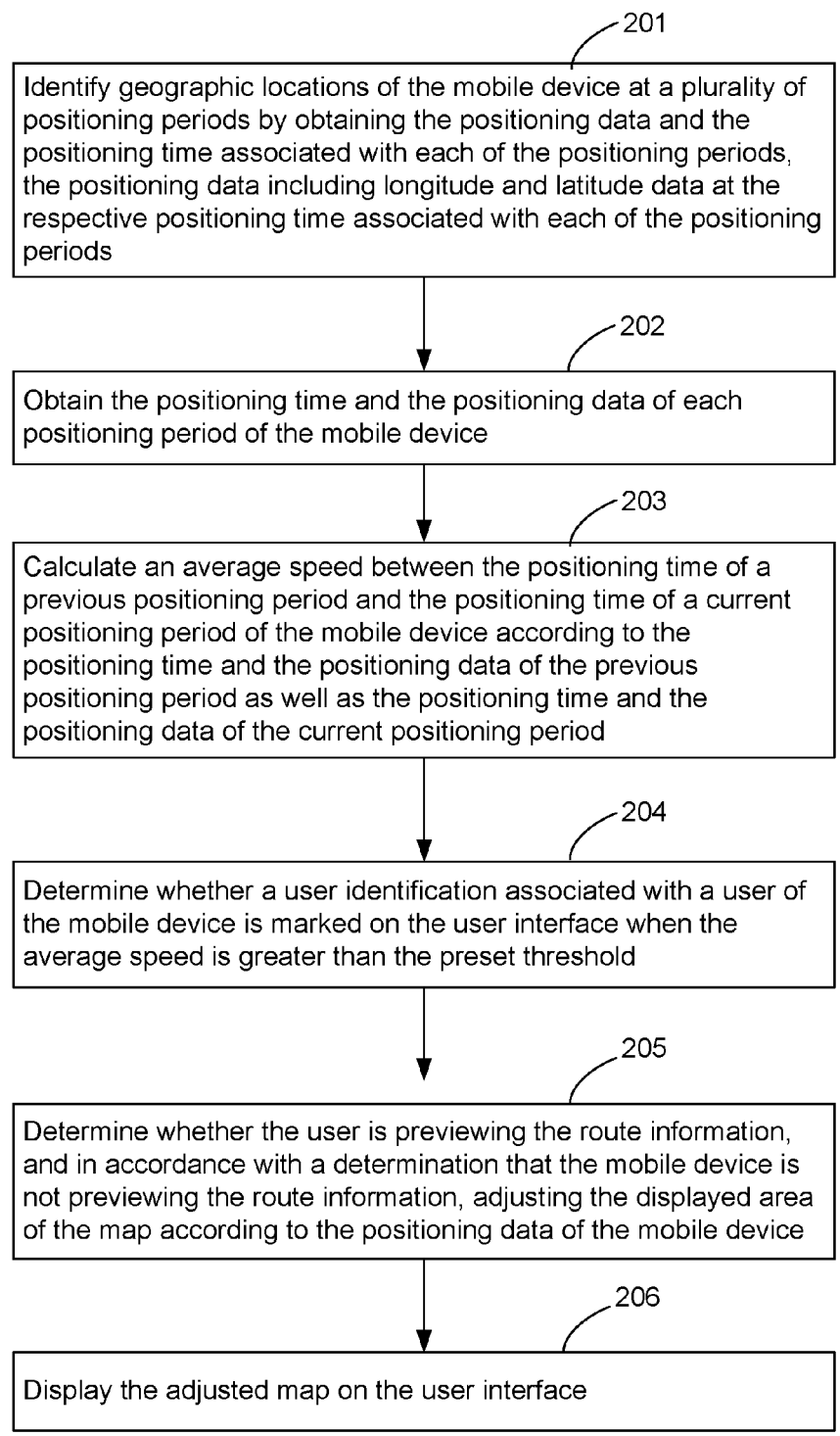
FIG. 2 is a flow chart of another exemplary geographic information display method in accordance with some embodiments.

FIG. 2 is a flow chart of another exemplary geographic information display method 200 in accordance with some embodiments. Method 200 is, optionally, governed by instructions that are stored in a non-transitory computer readable storage medium and that are executed by one or more processors of a mobile device (e.g., a global positioning system (GPS) device, a smart phone, a personal digital assistant (PDA), a tablet and a laptop computer). Each of the operations shown in FIG. 2 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 200 may be combined and/or the order of some operations may be changed.

In accordance with some embodiments of geographic information display method 200, the mobile device identifies (201) geographic locations of the mobile device at a plurality of positioning periods by obtaining the positioning data and the positioning time associated with each of the positioning periods. In some embodiments, the positioning data include longitude and latitude data at the respective positioning time associated with each of the positioning periods. In a specific example, each positioning period lasts for 0.5, 1 or 1.5 second.

Optionally, the geographic locations of the mobile device are identified based on GPS positioning technology. Optionally, the geographic locations of the mobile device are identified according to its relative locations within a network. Optionally, the geographic locations of the mobile device are identified with reference to base station locations in a cellular network.

In some embodiments, the positioning data (i.e., geographic location information) includes the longitude and the latitude data of the corresponding geographic locations of the mobile device. That is, at each positioning time, the mobile device obtains a pair of coordinate values (e.g., a longitude value and a latitude value). Alternatively, in some implementations, the positioning data further include information concerning positioning accuracy. Further, in some embodiments, at each positioning time, the mobile device obtains a timestamp associated with the positioning time when it obtains the longitude and latitude values. After the mobile device is positioned each time, the positioning data and the positioning time are then stored in a storage medium of the mobile device, and the storage medium includes a memory, a flash memory or a hard disk and the like.

It is noted that after obtaining the positioning data and the positioning times, the mobile device updates the displayed map according to the positioning data during each of the positioning periods. More details are explained below with reference to operations 202-206 of geographic information display method 200.

The mobile device obtains (202) the positioning time and the positioning data of each positioning period. In some embodiments, the positioning time and the positioning data of each positioning period of the mobile device are obtained directly from the storage medium of the mobile device. In a specific example, the storage medium of the mobile device includes a memory, then the positioning time and the positioning data of each positioning period of the mobile device are obtained directly from the memory of the mobile device.

After obtaining the positioning time and data, the mobile device calculates (203) an average speed between the positioning time of a previous positioning period and the positioning time of a current positioning period of the mobile device according to the positioning time and the positioning data of the previous positioning period as well as the positioning time and the positioning data of the current positioning period. In some embodiments, the following steps 203(a)-203(c) are implemented to calculate the average speed between the positioning time of the previous positioning period and the positioning time of the current positioning period according to the positioning time and the positioning data of the previous positioning period as well as the positioning time and the positioning data of the current positioning period.

At Step 203(a), the mobile device calculates a displacement of the mobile device according to the positioning data of the current positioning period and the positioning data of the previous positioning period.

The primary unit in which longitude and latitude are given is degrees (°). There are 360° of longitude (180° E↔180° W) and 180° of latitude (90° N↔90° S). Each degree can be broken into 60 minutes ('). Each minute can be divided into 60 seconds ("). For finer accuracy, fractions of seconds given by a decimal point are used. The meridian of the earth has a total length of approximately 40008 km. One degree of latitude is approximately associated with a distance of 111 km on average; one minute of latitude is approximately associated with a distance of 1.85 km; one second of latitude is approximately associated with a distance of 30.9 m. Suppose that the earth is a perfect sphere whose radius is the mean radius of the earth (R). The zero-degree longitude line is regarded as a reference line. The distance between any two points on the earth's surface could be calculated according to the longitude data and the latitude data of the two points.

In some embodiments, a position A is associated with the positioning data of the current positioning period, and the positioning data includes a longitude value longA and a latitude value latA. A position A is associated with the positioning data of the previous positioning period, and the positioning data includes a longitude value longB and a latitude value latB. When the zero-degree longitude line is regarded as a reference line, the longitude values on the eastern sphere is associated with positive values (e.g., +longitude), while the longitude values on the western sphere is associated with negative values (e.g., −longitude). The latitude values on the northern and southern spheres are represented as (90−latitude) and (90+latitude), respectively, where the parameter latitude is a positive number between 0 and 90. Then, the coordinate values of positions A and B are represented by (MlongA, MlatA) and (MlongB, MlatB) on the earth coordinate system. The displacement D between the two points of point A and point B is calculated as follows:

$$\text{Distance } D = R * \text{Arccos}(C) * Pi/180 \quad (1)$$

$$C = \sin(MlatA) * \sin(MlatB) * \cos(MlongA - MlongB) + \cos(MlatA) * \cos(MlatB) \quad (2)$$

wherein R and D have the same unit (e.g., kilometer).

It is noted that the above embodiments based on the earth coordinate system is only one exemplary method for calculating the displacement of the mobile device, and other calculation methods could also be used to calculate the displacement of the mobile device according to the positioning data.

At Step 203(b), the mobile device further calculates the time difference between the positioning time of the current positioning period and the positioning time of the previous positioning period.

At Step 203(c), the mobile device further calculates the average speed between the positioning time of the previous positioning period and the positioning time of the current positioning period of the mobile device according to the displacement and the time difference.

In some implementations, the time difference is ΔT. As obtained at step 203(a), the displacement between the positioning time of the previous positioning period and the positioning time of the current positioning period of the mobile device is Distance (D). Therefore, the average speed V is represented by: V=Distance/ΔT.

In some embodiments, at Step 204, the mobile device determines whether a user identification associated with a user of the mobile device is marked on the user interface when the average speed is greater than the threshold speed; and executing step 205 when it is determined that the user identification is marked on the user interface. In a specific example, the threshold speed is predetermined as 15 kilometers/hour. The threshold speed is optionally equal to other values, e.g., 10 kilometers/hour and 20 kilometers/hour, and this application has no specific limitation thereon.

In some situations, at a specific instant of navigation, the user is performing a user action (e.g., a swipe by a finger) on the user interface for the purposes of previewing a route or checking information related to a route. To facilitate previewing the route and checking the related information, the mobile device could move the user identification out of the displayed area of the map, e.g., display an area of the map that is not marked with the user identification or load an information page in front of the map. In these situations, when it is determined that the user identification is not displayed on the user interface at the specific instant of navigation, the position of the user identification does not need to be locked on the user interface to update the geographic information of the mobile device.

In the above situations, the user identification is typically marked as a unique pictorial item, e.g., a round or a bubble-like icon. The mobile device determines whether the user identification is marked on the user interface by checking whether a round or bubble-like icon is present on the user interface. If present, it is determined that the user identification is displayed on the user interface, and the following step 205 is performed. If it is determined that the user identification is not marked on the user interface, the mobile device forgoes updating the geographic information of the mobile device on the user interface and terminates the process of displaying geographic locations.

In some embodiments, at step 205, the mobile device determines whether the user is previewing the route information, and in accordance with a determination that the mobile device is not previewing the route information, adjusts the displayed area of the map according to the positioning data of the mobile device. The display position of corresponding user identification of the mobile device remains unchanged on the user interface. For example, the user identification is consistently marked at the center of the user interface (i.e., the center of the screen of the mobile device), when the user is not previewing the route information.

In some embodiments, if it is determined that the user identification is displayed on the user interface according to the above step 204, there is also a need to further determine whether the user is previewing the route information. Route preview is often associated with a user action, e.g., a swipe by a user finger on the user interface, to adjust the displayed area of the map on the user interface. When the user performs the exemplary swipe operation on the mobile device, a thermosensitive element or a sensor of the screen of the mobile device detects the contact of the user finger thereon. The mobile device analyzes the contact signal and determines whether the user is previewing the route information. If the user is not previewing the route information, the user is not previewing the route information, and the position of the user identification is locked on the user interface.

In some implementations, a normal travelling mode includes a preview mode in which the user of the mobile device previews the route information of a trip, and a driving mode is activated while the user is driving and does not operate on the mobile device. During navigation, a normal traveling mode could switch to a driving mode. After switching to the driving mode, no matter how the position of the user changes, the display position of the user identification remains unchanged on the user interface. In some implementations, in the driving mode, the user changes the displayed area of the map through a user action on the user interface, and thereby view more map information about the road ahead. During this course, the map is zoomed out while the user identification is marked on the displayed map and stays on the same location on the user interface (e.g., the center of the screen). However, when the user activates the preview mode to preview the route information, the mobile device forgoes displaying the user identification on the same location of the user interface.

In some embodiments, the mobile device adjusts (205) the displayed area of the map according to the positioning data of the mobile device by the following sub-steps of 205(a)-205(c).

At sub-step 205(a), the mobile device calculates coordinate offset values on the user interface for two geographic locations where the mobile device are located at a previous instant and a current instant, wherein the two geographic locations are associated with current positioning data and previous positioning data obtained at the previous and current instants, respectively, and these positioning data are used to calculate the coordinate offset values on the user interface;

During the continuous change of the position of the mobile device, a pixel displacement of the user identification on the user interface within a positioning period may be calculated according to the actual geographic displacement of the mobile device within a positioning period. The actual geographic displacement is in direct proportion to the pixel displacement. The coordinate offset value for the user identification that represents the user on the user interface is associated with the pixel displacement of the user identification on the user interface. After the geographic displacement of the mobile device within the current positioning period is calculated according to the positioning data at the previous and current instants, the coordinate offset value on the user interface is obtained according to a correlation between the actual geographic displacement and the pixel displacement.

At sub-step 205(b), the mobile device obtains coordinate values and coordinate offset values of a current central point displayed on the user interface at the current instant, and identifying where the subsequent central point associated with a subsequent instant is located on the user interface that is currently displayed, wherein the mobile device calculates coordinate values of the subsequent central point on the map that is currently displayed on the user interface.

In a specific example, coordinate values of a current position are (x1, y1) at a current instant, and coordinate value of a previous position are (x2, y2) at a previous instant. The coordinate offset values are represented by ($\Delta x$, $\Delta y$) which are therefore equal to (x2−x1, y2−y1). Further, coordinate values are (x3, y3) for the central point of the displayed area of the map at the current instant, and changes to (x4, y4) for the central point at the subsequent instant. Assume coordinate values of (x3, y3) and (x4, y4) have the same coordinate offset values of coordinate values (x1, y1) and (x2, y2). Thus, coordinate values (x4, y4) is equal to (x3+$\Delta x$, y3+$\Delta y$).

At sub-step 205(c), the mobile device uses the subsequent central point of the displayed area as a reference point, and moves the current displayed area of the map according to the coordinate offset values of the current central point, until the location associated with the subsequent central point coincides with the central point of the user interface.

Figure 3B:
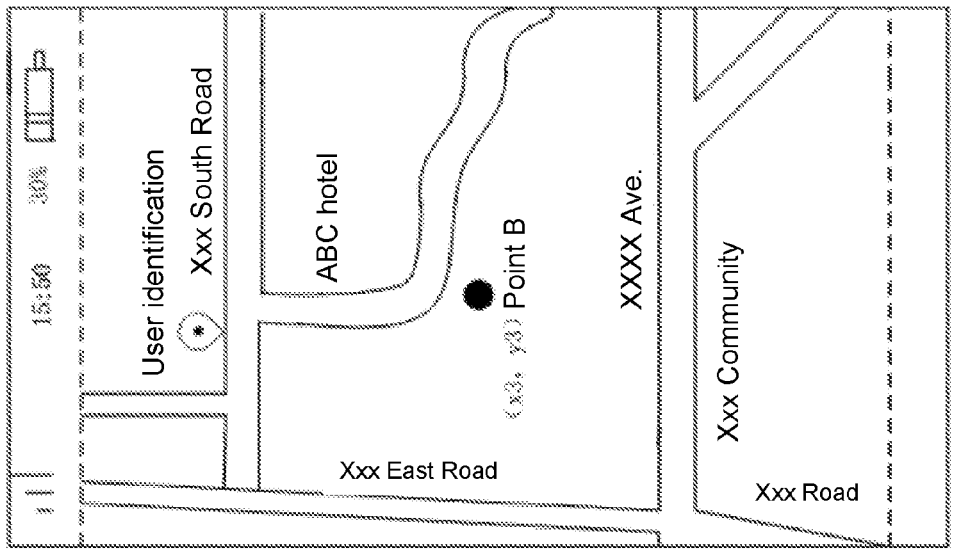
FIGS. 3A and 3B are exemplary user interfaces that display a map before and after adjustment of a displayed area in accordance with some embodiments, respectively.
Figure 3A:
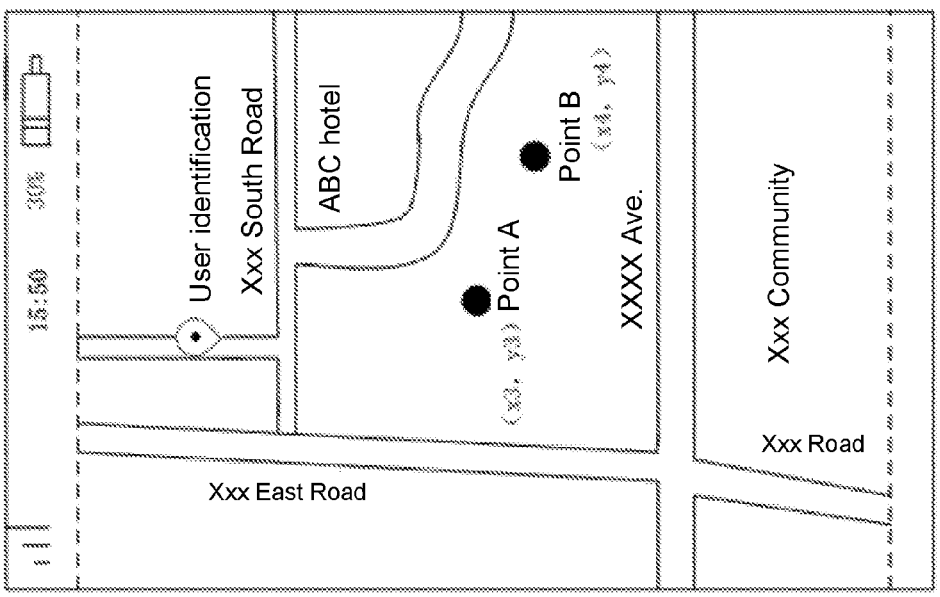

FIGS. 3A and 3B are exemplary user interfaces that display a map before and after adjustment of a displayed area in accordance with some embodiments, respectively. The central point is point A on the displayed area of the map displayed at a current instant, and point B on the currently displayed map will be moved to the central point for display on the user interface at a subsequent instant. Thus, during the course of adjusting the displayed area of the map, central point B will be used as a reference point, and the displayed area is moved by the coordinate offset value ($\Delta x$, $\Delta y$) until the point B is moved to the central point of the user interface. As shown in FIG. 3A, before the displayed area of the map is moved, point A is located at the geometric center point of the user interface, and after the displayed area is adjusted according to the coordinate offset value, point B becomes the geometric center point of the user interface. The adjusted map displayed area is shown in FIG. 3B. While in FIGS. 3A and 3B, the corresponding user identification of the mobile device is always located at the same position of the user interface. That is, the position of the user identification on the user interface is locked. For example, the position of the user identification is locked on the center of the top half screen of the user interface.

In some implementations, the mobile device does not determines whether a user identification associated with a user of the mobile device is marked on the user interface when the average speed is greater than the threshold speed as in operation 204. Alternatively, in some implementations, the mobile device does not determine whether the user is previewing the route information as in part of operation 205. Rather, in some implementations, after determining that the average speed is greater than the threshold speed, the mobile device locks the position of the user identification displayed on the user interface, and adjusts the displayed area of the map according to the position data of the mobile device as in part of operation 205.

Further, at step 206, the mobile device displays part of the map on the user interface.

In various embodiments of the present application, the user identification is locked at a fixed position on the user interface. The fixed position could be any position on the user interface. In some implementations, after the position of the user identification is locked, the user is detected to perform a finger swipe operation to preview the route information, and the map area is adjusted without changing the display position of the user identification on the user interface. Specifically, to fix the location of the user identification marked on the user interface, the mobile device zooms out the map to display both the user identification and the route information. As such, such a geographic information display method could improve the display effect of the map by displaying the geographic location of the mobile device while enabling preview of the route information.

In summary, in various embodiments of the present application, the mobile device obtains the positioning time and the positioning data of each positioning period of the mobile device, and then calculates the average speed between the positioning time of the previous positioning period and the positioning time of the current positioning period according to the positioning time and data associated with the previous positioning period, and the positioning time and data associated with the current positioning period. When the average speed is greater than a threshold speed, the mobile device adjusts the displayed area of the map on the user interface according to the positioning data of the mobile device. Specifically, the mobile device fixes, on the user interface, the position of the corresponding user identification of the mobile device. As such, the displayed area of the map is adjusted without changing the display position of the user identification, thereby optimizing display effect of the map. Stated another way, the displayed area of the map is optionally shifted, zoomed in, or zoomed out with reference to the location of the mobile device.

It should be understood that the particular order in which the operations in FIG. 2 have been described are merely exemplary and are not intended to indicate that the described order is the only order in which the operations could be performed. One of ordinary skill in the art would recognize various ways to displaying the geographic information of the mobile device as described herein. Additionally, it should be noted that details of other processes described elsewhere with respect to methods 100 and 700 (e.g., FIGS. 1 and 7) are also applicable in an analogous manner to method 100 described above with respect to FIG. 2. For brevity, these details are not repeated here.

Figure 4B:
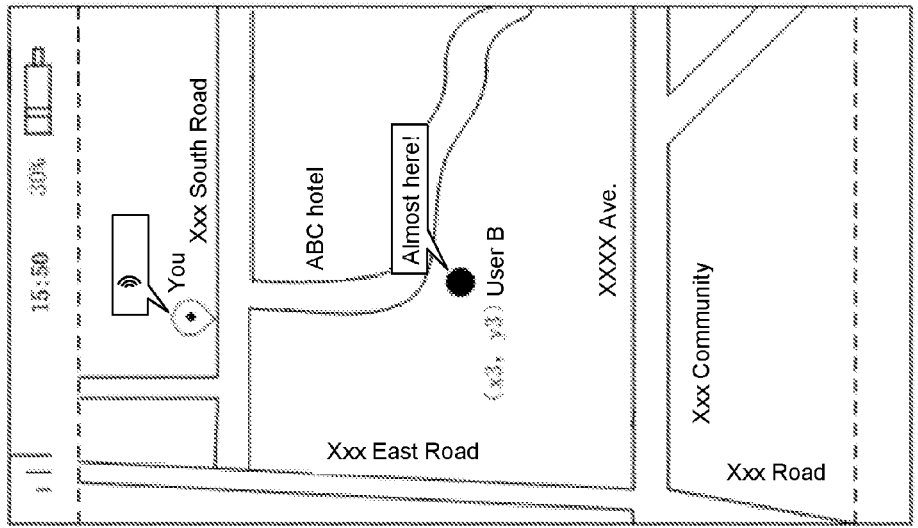
FIGS. 4A and 4B are exemplary user interfaces that are associated with an instant messaging application and display a map before and after adjustment of a displayed area in accordance with some embodiments, respectively.
Figure 4A:
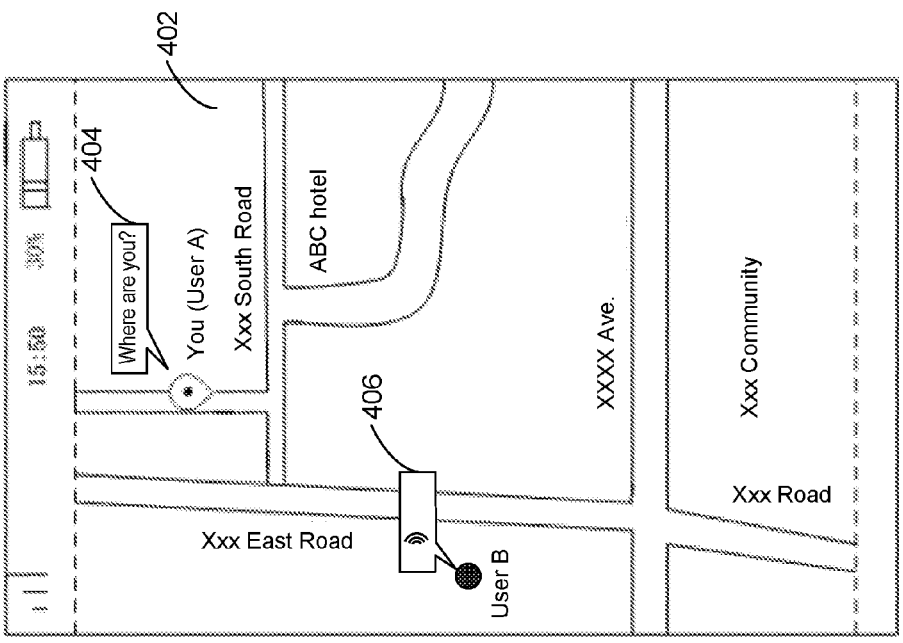

FIGS. 4A and 4B are exemplary user interfaces that are associated with an instant messaging application and display a map before and after adjustment of a displayed area in accordance with some embodiments, respectively. In some implementations, geographic information is displayed on a map that is loaded on a social media application (e.g., an instant messaging application). In response to a user action (e.g., a user selection of a navigation mode by a first user, user A), a navigation map 402 is loaded on the instant messaging application. The aforementioned geographic information display methods (e.g., methods 100 and 200) are implemented to display a user identification associated with user A on the navigation map 402. In accordance with methods 100 and 200, the location of the user identification of user A is fixed on the user interface, while the displayed area of the map is updated to reflect the geographic information of the mobile device and user A on the real time.

In some implementations, the displayed area of map 402 further includes another user identification associated with a distinct user, user B. Users A and B are related to each other in the instant messaging application. For example, in WeChat, users A and B recognize each other as friends. As such, the geographic information of user B are also obtained by the mobile device associated with user A, and used to mark the geographic location of user B on the map 402 that is displayed to user A. However, the location of the user identification associated with user B is not fixed on the user interface.

Further, while displaying the geographic locations of users A and B, the user interface is configured to display message information associated with the instant messages exchanged between these two users. For example, users A and B have a conversation concerning this trip, e.g., inquiring about each other's status, traffic conditions and other parties' statuses. The message information is displayed next to the user identification that initiates the corresponding instant message. For example, prior to the adjustment of the displayed area of the map, a text box 402 is displayed next to the user identification associated with user A, and includes a text message inquiring "Where are your"? User B responds with a voice message represented by a voice message item 406. Optionally, the voice message is played automatically during the navigation or upon receiving a user click.

As shown in FIGS. 4A and 4B, the user interface integrates both functions of instant messaging and geographic navigation. The mobile device is enabled to guide its own navigation, monitor its own navigation status, and track another party's navigation status, while maintain real time communication with the other party.

Figure 5:
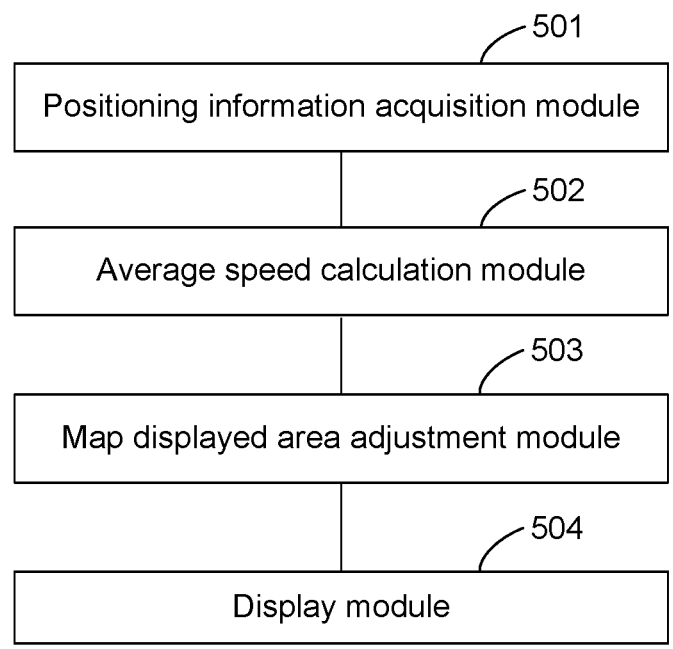
FIG. 5 is a block diagram of an exemplary geographic information display module in accordance with some embodiments.

FIG. 5 is a block diagram of an exemplary geographic information display module 500 in accordance with some embodiments. Geographic information display module 500 includes a positioning information acquisition module 501, an average speed calculation module 502, a map displayed area adjustment module 503 and a display module 504.

Positioning information acquisition module 501 is configured to obtain the positioning time and the positioning data of each positioning period of the mobile device Average speed calculation module 502 is coupled to positioning information acquisition module 501, and configured to calculate the average speed between the positioning time of the previous positioning period and the positioning time of the current positioning period according to the positioning time and data of the previous positioning period as well as the positioning time and data of the current positioning period. Map displayed area adjustment module 503 is coupled to average speed calculation module 502, and configured to adjust the displayed area of the map displayed on the user interface according to the positioning data of the mobile device when the average speed is greater than a threshold speed. As explained above, the displayed area of the map is adjusted while a user identification representing the mobile device is fixed at a predetermined position on the user interface. Display module 504 is coupled to map displayed area adjustment module 503, and configured to display the map including its adjusted displayed area on the user interface.

In some embodiments, geographic information display module 500 further includes:
  a mobile device positioning module for positioning the mobile device during each positioning period to obtain the positioning data of each positioning period of the mobile device, wherein the positioning data includes the longitude and the latitude data associated with the mobile device; and
  a time recording module for recording the positioning time at which the mobile device is positioned.

In some embodiments, the average speed calculation module comprises:

a displacement calculation unit for calculating the displacement of the mobile device according to the positioning data of the current positioning period and the positioning data of the previous positioning period;
  a time difference calculation unit for calculating the time difference between the positioning time of the current positioning period and the positioning time of the previous positioning period; and
  an average speed calculation unit for calculating the average speed between the positioning time of the previous positioning period and the positioning time of the current positioning period of the mobile device according to the displacement and the time difference.

In some embodiments, geographic information display module 500 further includes:
  a determination module for determining whether the user identification is displayed on the user interface; and
  a map displayed area adjustment module for adjusting the displayed area of the map according to the positioning data of the mobile device when it is determined that the user identification is marked on the user interface.

In some embodiments, geographic information display module 500 further includes:
  a detection module for detecting whether the user is performing the determining operation for the map information to be displayed; and
  a map displayed area adjustment module for performing the step of adjusting the map displayed area according to the positioning data of the mobile device when detecting that the user is not performing the determining operation for the map information to be displayed.

In some embodiments, the above map displayed area adjustment module comprises:
  a position coordinate calculation unit for calculating the coordinate offset value of corresponding user identification of the mobile device on the user interface according to the current positioning data and the last positioning data of the mobile device; and calculating the coordinate value of the position of the central point of the map displayed area to be displayed according to the coordinate value of the position of the central point of the current map displayed area and the coordinate offset value; and
  a map displayed area adjustment unit for moving the current map displayed area according to the coordinate offset value by using the central point of the map displayed area to be displayed as a reference point, until the position coordinates of the central point of the displayed area to be displayed coincide with the position coordinates of the central point of the current map displayed area to obtain the adjusted map displayed area.

In accordance with various embodiments of the present application, geographic information display module 500 obtains the positioning time and the positioning data of each positioning period of the mobile device, and thereby calculates the average speed between the positioning time of the previous positioning period (i.e., a previous instant) and the positioning time of the current positioning period (i.e., a current instant). And when the average speed is greater than the threshold speed, the displayed area of the map is adjusted according to the positioning data of the mobile device with the corresponding user identification representing the mobile device fixed on a specific location on the user interface. Given that the position of the user identification is locked on the user interface, the displayed area of the map is therefore adjusted without changing the display position of the user identification, thereby improving the display effect of the map.

Figure 6:
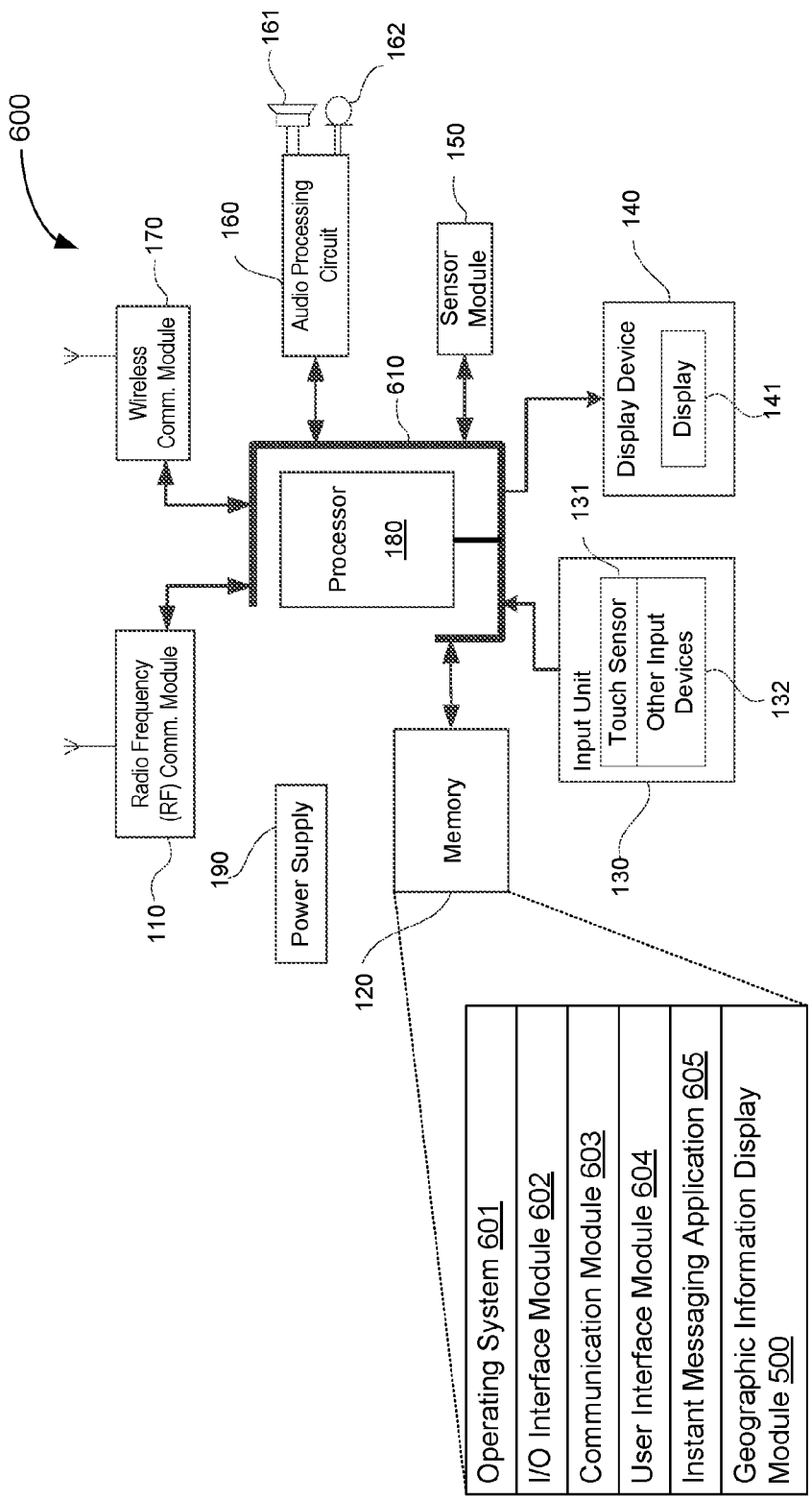
FIG. 6 is a block diagram of an exemplary mobile device that displays geographic information in accordance with some embodiments.

FIG. 6 is a block diagram of an exemplary mobile device 600 that displays geographic information in accordance with some embodiments. In some implementations, mobile device 600 includes one or more processors 180, memory 120 for storing programs and instructions for execution by one or more processors 180, one or more communications interfaces such as input/output interface 130 and 140, and network interface (e.g., 110 and 170), and one or more communications buses 610 for interconnecting these components.

In some embodiments, input/output interface 130 and 140 includes a display and input devices such as a keyboard, a mouse or a track-pad. In some embodiments, communication buses 610 include circuitry (sometimes called a chipset) that interconnects and controls communications between system components. In some embodiments, memory 120 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 120 includes one or more storage devices remotely located from the one or more processors 180. In some embodiments, memory 120, or alternatively the non-volatile memory device(s) within memory 120, includes a non-transitory computer readable storage medium.

In some embodiments, memory 120 or alternatively the non-transitory computer readable storage medium of memory 120 stores the following programs, modules and data structures, instructions, or a subset thereof:

- Operating System 601 that includes procedures for handling various basic system services and for performing hardware dependent tasks;
- I/O module 602 that includes procedures for handling various basic input and output functions through one or more input and output devices;
- Communication module 603 that is used for connecting mobile device 600 to other machines (e.g., another mobile device associated with user B in FIGS. 4A and 4B) or servers via one or more wired or wireless network communication interfaces (e.g., 110 and 170) and one or more communication networks, such as the Internet, other wide area networks, local area networks, metropolitan area networks, and so on;
- User Interface module 604 that creates and updates a user interface to display information related to and receive user inputs from various software applications (e.g., a social media application, an instant messaging application or a GPS application);
- Instant Messaging Application 605 that is configured to allow two or more users to exchange messages on the real time over the Internet; and
- Geographic Information display module 500 that obtains geographic location information of one or more users at one or more instants, marks the locations of the one or more users on a map that is displayed on the user interface, and updates the displayed map according to the geographic location variations of the one or more users, wherein a user identification associated with a user of the mobile device including module 500 is fixed at a specific location on the user interface.

In some embodiments, geographic information display module 500 is a plug-in module that is embedded in instant messaging application 605.

As such, various embodiments of the present application provide a mobile device that is configured to display geographic location information of one or more mobile devices on a map whose displayed area on the user interface is adjustable according to the geographic location information. Specifically, in some embodiments, a mobile device 600 includes: an RF (Radio Frequency) communication unit 110, a storage 120 including one or more computer readable storage media, an input unit 130, a display unit 140, sensors 150, an audio circuit 160, a wireless communication unit 170, a processor 180 including one or more processing cores, a power supply 190 and the like. It should be understood that the exemplary structure of mobile device 600 does not constitute a limitation of the mobile device. A mobile device optionally includes more or fewer parts than mobile device 600, and some parts could be combined. Different arrangement of parts could also be adopted as needed.

The RF communication unit 110 may be used for receiving and sending a signal during the course of communicating information, and particularly may be used for sending downlink information of a base station to one or more processors 180 for processing after receiving the downlink information, and sending uplink data to the base station. Generally, the RF communication unit 110 comprises, but not limited to, an antenna, at least one amplifier, a tuner, one or more oscillators, an SIM (Subscriber Identity Module) card, a transceiver, a coupler, an LNA (Low Noise Amplifier), a duplexer and the like. Furthermore, the RF communication unit 110 also can communicate with other equipment by wireless communication and the network. The wireless communication may be used with any one of communication standards or protocols which include, but not limited to, GSM (Global System of Mobile Communication), a GPRS (General Packet Radio Service), CDMA (Code Division Multiple Access), WCDMA (Wideband Code Division Multiple Access), LTE (Long Term Evolution), E-mail, an SMS (Short Messaging Service) and the like.

The storage 120 (also called memory 120) may be used for storing software programs and software modules. The processor 180 executes various functional applications and data processing by running the software programs and the software modules, which are stored in the storage 120. The storage 120 may mainly comprise a program storage region and a data storage region, wherein the program storage region may be used for storing operating systems, applications required by at least one function (such as a sound play function, an image play function etc.,) and the like; and the data storage region may be used for storing data (such as audio data, a telephone book etc.,) and the like which are created in use of mobile device 600. Furthermore, the storage 120 may include a high speed RAM (Random Access Memory) and may also include a non-volatile memory such as disk storage device, flash memory device or other volatile solid storage devices. Correspondingly, the storage 120 also may include a storage controller for providing access from the processor 180 and the input unit 130 to the storage 120.

The input unit 130 may be used for receiving input number or character information and generating signal input related to the user's setting and functional control, from keyboard, mouse, operating rod, optical or trackball. Particularly, the input unit 130 may comprise a touch sensitive surface 131 and other input equipment 132. The touch sensitive surface 131 is also called a touch display screen or a touch control panel and may be used for detecting touch operations (for example, operations carried out by the user by using any suitable objects or attachments, such as a finger, a touch pen and the like, on the touch sensitive surface 131 or near the touch sensitive surface 131) by the user on the touch sensitive surface or near the touch sensitive surface and driving corresponding apparatus connected therewith according to a preset program. Optionally, the touch sensitive surface 131 may comprise a touch detection apparatus and a touch controller. Wherein, the touch detection apparatus may be used for detecting the touch direction of the user, detecting a signal caused by the touch operation and transmitting the signal to the touch controller. The touch controller may be used for receiving the touch information from the touch detection apparatus, converting the touch information into contact coordinates and then sending the contact coordinates to the processor 180 and may also receive a command sent by the processor 180 and execute the command. Moreover, the touch sensitive surface 131 may be implemented in various types such as a resistance type, a capacitance type, an infrared type, a surface acoustic wave type and the like. In addition to the touch sensitive surface 131, the input unit 130 may also include other input equipments 132. Specifically, other input equipments 132 may include, but not limited to, one or more of physical keyboard, virtual (function) key (such as volume control key, switching key and the like), trackball, mouse, operating rod and the like.

The display unit 140 may be used for displaying information input by the user or information provided for the user and various graphic user interfaces of mobile device 600, and the graphic user interfaces may be formed by graphs, texts, icons, videos and any combination thereof. The display unit 140 may include a display panel 141. Optionally, the display panel 141 may be configured in forms of an LCD (Liquid Crystal Display), an OLED (Organic Light-Emitting Diode) and the like. Furthermore, the touch sensitive surface 131 may cover the display panel 141. When the touch sensitive surface 131 detects a touch operation on or near the touch sensitive surface 131, the signal caused by the touch operation is transmitted to the processor 180 to determine the type of a touch event. Then the processor 180 provides a corresponding visual output on the display panel 141 according to the type of the touch event. In FIG. 6, the touch sensitive surface 131 and the display panel 141 are used as two independent parts for accomplishing input and output functions, however, in certain embodiments, the touch sensitive surface 131 and the display panel 141 may be integrated to accomplish the input and output functions.

Mobile device 600 may also include at least one sensor 150, such as light sensors, motion sensors and other sensors. Specifically, the optical sensors may include an ambient light sensor and a proximity sensor. The ambient light sensor may regulate the brightness of the display panel 141 according to the lightness of the ambient light. The proximity sensor may shut down the display panel 141 and/or backlight when mobile device 600 is moved to the position near an ear. As one of the motion sensors, the gravity acceleration sensor may detect the magnitude of an acceleration in each of the directions (generally, three directions or three axes), and may detect the magnitude and the direction of gravity in a stationary state, which may be used for posture identifying functions (such as switching between a horizontal screen and a vertical screen, switching related to a game, and calibration on the posture of a magnetometer), vibration identifying functions (such as for pedometer and striking) and the like, in the mobile device. Furthermore, a gyroscope, a barometer, a humidity meter, a thermometer, an infrared sensor and other sensors may be integrated into mobile device 600, to which explanation is not repeated herein.

The audio circuit 160, a speaker 161 and a microphone 162 may provide an audio interface between the user and mobile device 600. The audio circuit 660 may transmit an electric signal obtained by converting received audio data to the speaker 161, and the electric signal is converted into a sound signal to be output by the speaker 161. On the other hand, the microphone 162 converts a collected sound signal into an electric signal, the audio circuit 160 receives the electric signal and converts the electric signal into audio data. After the audio data is output to the processor 180 and is processed, the audio data is sent to another mobile phone through the RF communication unit 110, or the audio data is output to the storage 120 in order to be further processed. The audio circuit 160 may also comprise an earphone jack for providing the communication between an external headset and mobile device 600.

By the wireless communication unit 170, mobile device 600 may help the user to receive and send emails, browse web pages, access streaming media and the like. The wireless communication unit 170 provides wireless broadband internet access for the user.

The processor 180 is a control center of mobile device 600, is connected with all the parts of the whole mobile device by various interfaces and lines and is used for executing various functions of mobile device 600 and processing the data by operating the software programs and/or the modules stored in the storage 120, and calling the data stored in the storage 120 so as to carry out integral monitoring on the mobile device. Optionally, the processor 180 may comprise one or more processing cores. Preferably, an application processor and a modulation-demodulation processor may be integrated into the processor 180, wherein the application processor is mainly used for the operating system, the user interface, applications and the like, and the modulation-demodulation processor is mainly used for wireless communication. It should be understood that the modulation-demodulation processor also may be not integrated into the processor 180.

Mobile device 600 also includes the power supply 190 (such as a battery) for supplying power to each part. Preferably, the power supply may be logically connected with the processor 180 by a power supply management system so as to implement functions of charge management, discharge management, power consumption management and the like by the power supply management system. The power supply 190 may also include any components such as one or more DC (Direct Current) or AC (Alternating Current) power supplies, recharging systems, power supply fault detection circuits, power supply converters or inverters, power supply state indicators and the like.

Mobile device 600 may also include a camera, a Bluetooth module and the like although they are not shown in the figure, and explanations for them are not repeated herein. Specifically, In some embodiments, the display unit of the mobile device is a touch screen display.

The mobile device further comprises a storage and one or more programs, wherein the one or more programs are stored in the storage and are configured to be executed by the one or more processors, including instructions used for performing the following operations of:

obtaining the positioning time and the positioning data of each positioning period of the mobile device;

calculating the average speed between the positioning time of the previous positioning period and the positioning time of the current positioning period according to the positioning time and the positioning data of the previous positioning period as well as the positioning time and the positioning data of the current positioning period;

adjusting the displayed area of the map according to the positioning data of the mobile device when the average speed is greater than a threshold speed, so as to keep the display position of corresponding user identification of the mobile device on the user interface unchanged; and displaying the adjusted map on the user interface.

In some embodiments, the one or more programs stored in the storage further includes instructions for executing the following operations of:

positioning the mobile device every positioning period to obtain the positioning data of each positioning period of the mobile device, wherein the positioning data comprises the longitude data and the latitude data; and recording the positioning time at which the mobile device is positioned.

In some embodiments, the one or more programs stored in the storage further includes instructions for executing the following operations of:

calculating the displacement of the mobile device according to the positioning data of the current positioning period and the positioning data of the previous positioning period;

calculating the time difference between the positioning time of the current positioning period and the positioning time of the previous positioning period; and calculating the average speed between the positioning time of the previous positioning period and the positioning time of the current positioning period of the mobile device according to the displacement and the time difference.

In some embodiments, the one or more programs stored in the storage further includes instructions for executing the following operations of:

determining whether the user identification is displayed on the user interface;

adjusting the map displayed area according to the positioning data of the mobile device when it is determined that the user identification is displayed on the user interface.

In some embodiments, the one or more programs stored in the storage further includes instructions for executing the following operations of:

detecting whether the user is performing the operation for determining the map information to be displayed; and performing the step of adjusting the map displayed area according to the positioning data of the mobile device when detecting that the user is not performing the operation for determining the map information to be displayed.

In some embodiments, the one or more programs stored in the storage further includes instructions for executing the following operations of:

calculating the coordinate offset value of corresponding user identification of the mobile device on the user interface according to the current positioning data and the last positioning data of the mobile device;

calculating the coordinate value of the position of the central point of the map displayed area to be displayed according to the coordinate value of the position of the central point of the current map displayed area and the coordinate offset value; and taking the central point of the map displayed area to be displayed as a benchmark, moving the current map displayed area according to the coordinate offset value until the position coordinates of the central point of the displayed area to be displayed coincide with the position coordinates of the central point of the current map displayed area to obtain the adjusted map displayed area.

In accordance with various embodiments of the present application, mobile device 600 obtains the positioning time and the positioning data of each positioning period of the mobile device, and thereby calculates the average speed between the positioning time of the previous positioning period (i.e., a previous instant) and the positioning time of the current positioning period (i.e., a current instant). And when the average speed is greater than the threshold speed, the displayed area of the map is adjusted according to the positioning data of the mobile device with the corresponding user identification representing the mobile device fixed on a specific location on the user interface. Given that the position of the user identification is locked on the user interface, the displayed area of the map is therefore adjusted without changing the display position of the user identification, thereby improving the display effect of the map.

Another aspect of the application is a non-transitory computer-readable medium, having instructions stored thereon, which when executed by one or more processors cause the processors to perform operations to implement the above methods for displaying geographic information on a user interface of the mobile device. The computer readable storage medium stores one or more programs which are used by the one or more processors for executing the method for display the map information, and the method comprises:

obtaining the positioning time and the positioning data of each positioning period of the mobile device;

calculating the average speed between the positioning time of the previous positioning period and the positioning time of the current positioning period according to the positioning time and the positioning data of the previous positioning period as well as the positioning time and the positioning data of the current positioning period;

adjusting the displayed area of the map according to the positioning data of the mobile device when the average speed is greater than a threshold speed, so as to keep the display position of corresponding user identification of the mobile device on the user interface unchanged; and displaying the adjusted map on the user interface.

In some embodiments, the one or more programs stored in the storage further includes instructions for executing the following operations of:

positioning the mobile device every positioning period to obtain the positioning data of each positioning period of the mobile device, wherein the positioning data comprises the longitude data and the latitude data; and recording the positioning time at which the mobile device is positioned.

In some embodiments, the one or more programs stored in the storage further includes instructions for executing the following operations of:

calculating the displacement of the mobile device according to the positioning data of the current positioning period and the positioning data of the previous positioning period;

calculating the time difference between the positioning time of the current positioning period and the positioning time of the previous positioning period; and calculating the average speed between the positioning time of the previous positioning period and the positioning time of the current positioning period of the mobile device according to the displacement and the time difference.

In some embodiments, the one or more programs stored in the storage further includes instructions for executing the following operations of:

determining whether the user identification is displayed on the user interface;

adjusting the map displayed area according to the positioning data of the mobile device when it is determined that the user identification is displayed on the user interface.

In some embodiments, the one or more programs stored in the storage further includes instructions for executing the following operations of:

detecting whether the user is performing the operation for determining the map information to be displayed; and performing the step of adjusting the map displayed area according to the positioning data of the mobile device when detecting that the user is not performing the operation for determining the map information to be displayed.

In some embodiments, the one or more programs stored in the storage further includes instructions for executing the following operations of:

calculating the coordinate offset value of corresponding user identification of the mobile device on the user interface according to the current positioning data and the last positioning data of the mobile device;

calculating the coordinate value of the position of the central point of the map displayed area to be displayed according to the coordinate value of the position of the central point of the current map displayed area and the coordinate offset value; and taking the central point of the map displayed area to be displayed as a benchmark, moving the current map displayed area according to the coordinate offset value until the position coordinates of the central point of the displayed area to be displayed coincide with the position coordinates of the central point of the current map displayed area to obtain the adjusted map displayed area.

In accordance with various embodiments of the present application, mobile device 600 obtains the positioning time and the positioning data of each positioning period of the mobile device, and thereby calculates the average speed between the positioning time of the previous positioning period (i.e., a previous instant) and the positioning time of the current positioning period (i.e., a current instant). And when the average speed is greater than the threshold speed, the displayed area of the map is adjusted according to the positioning data of the mobile device with the corresponding user identification representing the mobile device fixed on a specific location on the user interface. Given that the position of the user identification is locked on the user interface, the displayed area of the map is therefore adjusted without changing the display position of the user identification, thereby improving the display effect of the map.

It should be noted that the apparatus for displaying the map information provided by the above embodiment is divided, for example, into the foregoing functional modules, when displaying the map information. In practical application, the function may be distributed to be accomplished by different functional modules as required, that is, the internal structure of the equipment is divided into different functional modules to accomplish all or part of the functions mentioned above. Moreover, the apparatus and method for displaying the map information provided by the above embodiment are covered by the same conception. The specific implementation thereof is described in detailed in the embodiment of the method, and will not be repeated herein.

The sequence number of the above embodiments of the application is only descriptive and does not represent merits of the embodiments.

It is understood by those ordinary skilled in the art that the implementation of all or part of the process of the above-described embodiment of the method can be accomplished by hardware or relevant hardware under instruction of a program that may be stored in a computer readable storage medium. The above-mentioned storage medium may be a read only memory (ROM), a magnetic disk or an optical disk, etc.

The present application has been described with reference to preferred embodiments which are not intended to limit the invention, and any modification, equivalent, improvement and the like made within the spirit and principle of the invention should fall in the protection scope thereof.

Figure 7:
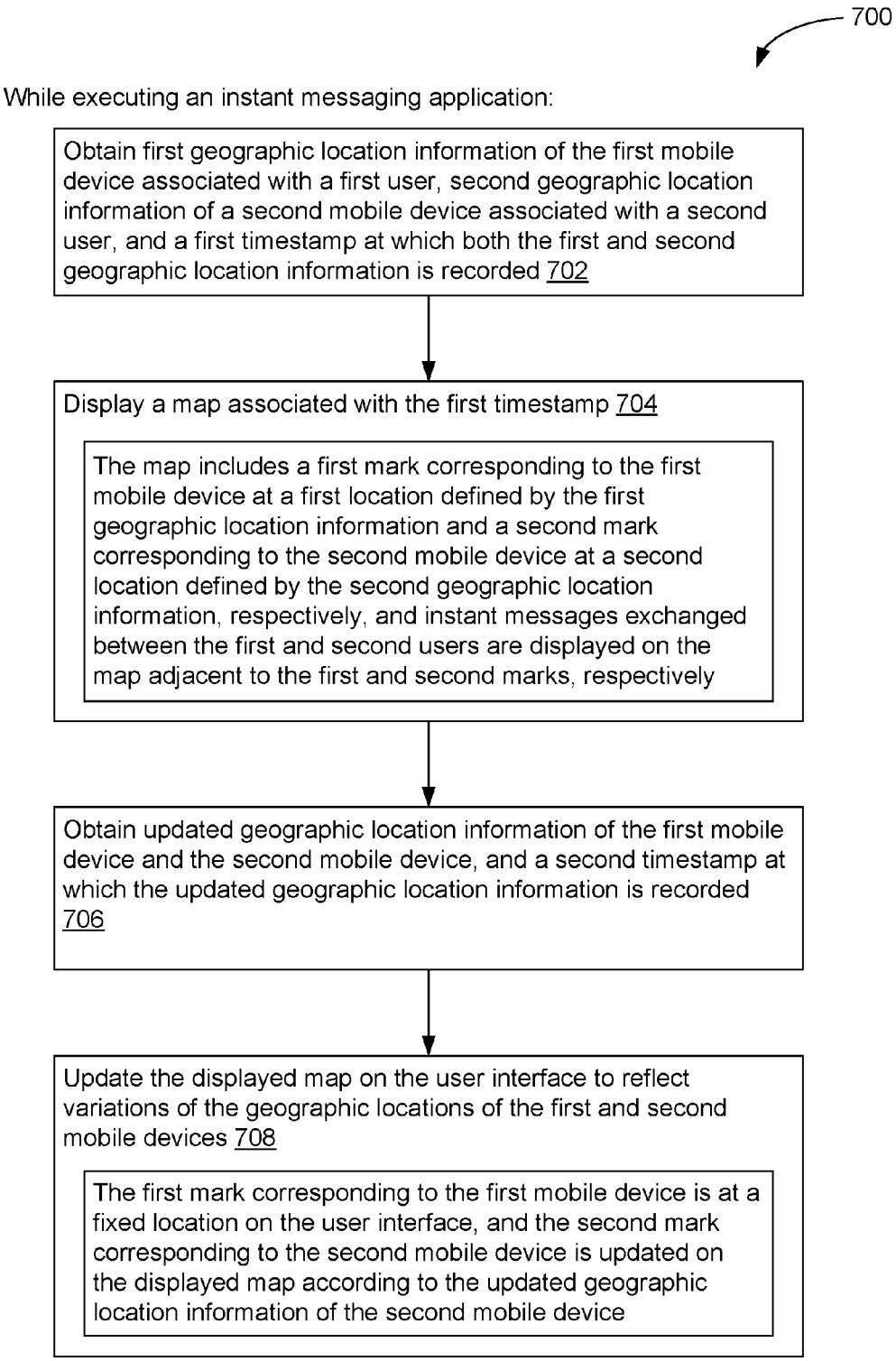
FIG. 7 is a flow chart of an exemplary geographic information display method that displays geographic information in an instant messaging application in accordance with some embodiments.

FIG. 7 is a flow chart of an exemplary geographic information display method 700 that displays geographic information in an instant messaging application in accordance with some embodiments. Method 700 is, optionally, governed by instructions that are stored in a non-transitory computer readable storage medium and that are executed by one or more processors of a mobile device (e.g., a global positioning system (GPS) device, a smart phone, a personal digital assistant (PDA), a tablet and a laptop computer). Each of the operations shown in FIG. 7 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 700 may be combined and/or the order of some operations may be changed.

Geographic information display method 700 is implemented by a first mobile device that executes a social media application (e.g., an instant messaging application). While executing the instant messaging application, the first mobile device obtains (702) first geographic location information of the first mobile device associated with a first user, second geographic location information of a second mobile device associated with a second user, and a first timestamp at which both the first and second geographic location information is recorded;

Then, the first mobile device displays (704) a map associated with the first timestamp The map includes a first mark corresponding to the first mobile device at a first location defined by the first geographic location information and a second mark corresponding to the second mobile device at a second location defined by the second geographic location information, respectively. Instant messages are exchanged between the first and second users are displayed on the map adjacent to the first and second marks, respectively.

After displaying the map associated with the first timestamp, the first mobile device obtains (706) updated geographic location information of the first mobile device and the second mobile device, and a second timestamp at which the updated geographic location information is recorded.

The first mobile device then updates (708) the displayed map on the user interface to reflect variations of the geographic locations of the first and second mobile devices. The first mark corresponding to the first mobile device is at a fixed location on the user interface, and the second mark corresponding to the second mobile device is updated on the displayed map according to the updated geographic location information of the second mobile device.

In some implementations, the first mobile device calculates an average speed of the first mobile device based on the first geographic location information, the updated geographic location information of the first mobile device, the first timestamp, and the second timestamps. In accordance with a determination that the average speed is higher than a threshold speed, the mobile device determines whether the first user of the first mobile device is browsing the displayed map. The first user is browsing the displayed map for various purposes, e.g., previewing a route and looking for a destination.

In some situations, the displayed map is updated on the user interface of the first mobile device in accordance with a determination that the first user is not browsing the displayed map. Specifically, in some embodiments, it is determined that the user of the mobile device is browsing the displayed map when the first geographic position of the mobile device is not marked on the displayed map. In some embodiments, in accordance with a determination that the user is browsing the displayed map, the mobile device forgoes updating the displayed map and the geographic location of the second mobile device on the user interface Alternatively, in some other situations, the displayed map is updated (e.g., zoomed out) to display both the geographic location of the first mobile device and interested area the first user is browsing, and the first mark associated with the geographic location of the first mobile device is still fixed on a specific location on the user interface.

In some embodiments, the first and second timestamps are associated with a time separation, and the time separation is selected from a group consisting of: 1.5 seconds, 1 second, 0.5 second and 0.2 second. Therefore, in some implementations, the mobile device regularly obtains the geographic location information of the first and second mobile devices, and every two consecutive timestamps associated with the geographic location information have the time separation. More details on obtaining the geographic location information and updating the displayed map are explained above with reference to FIGS. 1 and 2.

In some embodiments, it is determined that the user of the mobile device is not browsing the displayed map when the user has not enabled any user action on the displayed map within a predetermined period of time with respect to the second timestamp.

In some embodiments, the first and second geographic location information includes GPS coordinates where the first and second mobile devices are located at the first timestamp, respectively, and the GPS coordinates are measured by a respective internal GPS embedded in the first and second mobile devices.

In some embodiments, the first geographic location information includes latitude and longitude values associated with the first location of the first client device, and the second geographic location information includes latitude and longitude values associated with the second location of the second client device.

In some embodiments, the updated map is displayed on the user interface with an identical zoom level of the map displayed in association with the first timestamp.

In some embodiments, the average speed of the mobile device is calculated by dividing a distance between the first geographic location and the updated geographic location information of the first mobile device by a time variation of the first and second timestamps. Further, in some embodiments, the distance between the first and second geographic locations is calculated from the first and second geographic location information in a spherical coordinate system. In some embodiments, updating the displayed map on the user interface includes calculating the geographic location information of a central point of the user interface in association with the first and second timestamps, respectively.

In some embodiments, instant messages exchanged between the first and second users include at least one of a voice message, a text message, a picture, a video clip, an information link and the like. When a voice message is exchanged, a voice message sign is displayed adjacent to a mark representing a sender of the voice message. A receiver of the voice message clicks on the voice message sign on the displayed map to listen to the voice message.

It should be understood that the particular order in which the operations in FIG. 7 have been described are merely exemplary and are not intended to indicate that the described order is the only order in which the operations could be performed. One of ordinary skill in the art would recognize various ways to displaying the geographic information of the mobile device as described herein. Additionally, it should be noted that details of other processes described elsewhere with respect to methods 100 and 200 (e.g., FIGS. 1 and 2) are also applicable in an analogous manner to method 700 described above with respect to FIG. 7. For brevity, these details are not repeated here.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A geographic information display method, comprising:
    at a first mobile device having one or more processors and memory storing programs for execution by the processors:
        while executing an instant messaging application:
            obtaining first geographic location information of the first mobile device associated with a first user, second geographic location information of a second mobile device associated with a second user, and a first timestamp at which both the first and second geographic location information is recorded;
            displaying a map associated with the first timestamp on a user interface, wherein the map includes a first mark corresponding to the first mobile device at a first location defined by the first geographic location information and a second mark corresponding to the second mobile device at a second location defined by the second geographic location information, respectively;
            displaying two instant messages exchanged between the first and second users on top of the map displayed in the user interface, further including: displaying a first user message sent by the first mobile device adjacent to the first mark and displaying a second user message sent by the second mobile device adjacent to the second mark;
            obtaining updated geographic location information of the first mobile device and the second mobile device, and a second timestamp at which the updated geographic location information of the first mobile device and the second mobile device is recorded;
            updating the displayed map on the user interface to reflect variations of the geographic locations of the first and second mobile devices, wherein the first mark corresponding to the first mobile device is at a fixed location on the user interface, and the second mark corresponding to the second mobile device is updated on the displayed map according to the updated geographic location information of the second mobile device;
            calculating an average speed of the first mobile device based on the first geographic location information, the updated geographic location information of the first mobile device, the first timestamp, and the second timestamp; and
            in accordance with a determination that the average speed is higher than a threshold speed, determining whether the first user of the first mobile device is browsing the displayed map;
            wherein the displayed map is updated on the user interface of the first mobile device in accordance with a determination that the first user is not browsing the displayed map.

2. The method of claim 1, wherein it is determined that the first user of the first mobile device is browsing the displayed map when the first geographic position of the first user of the first mobile device is not marked on the displayed map.

3. The method of claim 1, further comprising: in accordance with a determination that the user is browsing the displayed map, forgoing updating the displayed map and the geographic location of the second mobile device on the user interface.

4. The method of claim 1, wherein the first and second timestamps are associated with a time separation, and the time separation is selected from a group consisting of: 1.5 seconds, 1 second, 0.5 second and 0.2 second.

5. The method of claim 1, wherein the first and second geographic location information includes GPS coordinates where the first and second mobile devices are located at the first timestamp, respectively, and the GPS coordinates are measured by a respective internal GPS embedded in the first and second mobile devices.

6. The method of claim 1, wherein the first geographic location information includes latitude and longitude values associated with the first location of the first mobile device, and the second geographic location information includes latitude and longitude values associated with the second location of the second mobile device.

7. The method of claim 1, wherein the updated map is displayed on the user interface with an identical zoom level of the map displayed in association with the first timestamp.

8. The method of claim 1, wherein an average speed of the mobile device is calculated by dividing a distance between the first geographic location and the updated geographic location information of the first mobile device by a time variation of the first and second timestamps.

9. The method of claim 8, wherein the distance between the first and second geographic locations is calculated from the first and second geographic location information in a spherical coordinate system.

10. The method of claim 9, wherein updating the displayed map on the user interface includes calculating the geographic location information of a central point of the user interface in association with the first and second timestamps, respectively.

11. The method of claim 1, wherein the instant messages exchanged between the first and second users include at least one of a voice message, a text message, a picture, a video clip and an information link.

12. The method of claim 1, wherein the instant messages includes a voice message, and a voice message sign is displayed adjacent to a mark representing a sender of the voice message, and wherein a receiver of the voice message clicks on the voice message sign on the displayed map to listen to the voice message.

13. A mobile device, wherein the mobile device includes a first mobile device, comprising:
one or more processors; and
memory having instructions stored thereon, which when executed by the one or more processors cause the processors to perform operations, comprising:
while executing an instant messaging application:
obtaining first geographic location information of the first mobile device associated with a first user, second geographic location information of a second mobile device associated with a second user, and a first timestamp at which both the first and second geographic location information is recorded;
displaying a map associated with the first timestamp on a user interface, wherein the map includes a first mark corresponding to the first mobile device at a first location defined by the first geographic location information and a second mark corresponding to the second mobile device at a second location defined by the second geographic location information, respectively;
displaying two instant messages exchanged between the first and second users on top of the map displayed in the user interface, further including: displaying a first user message sent by the first mobile device adjacent to the first mark and displaying a second user message sent by the second mobile device adjacent to the second mark;
obtaining updated geographic location information of the first mobile device and the second mobile device, and a second timestamp at which the updated geographic location information of the first mobile device and the second mobile device is recorded;
updating the displayed map on the user interface to reflect variations of the geographic locations of the first and second mobile devices, wherein the first mark corresponding to the first mobile device is at a fixed location on the user interface, and the second mark corresponding to the second mobile device is updated on the displayed map according to the updated geographic location information of the second mobile device;
calculating an average speed of the first mobile device based on the first geographic location information, the updated geographic location information of the first mobile device, the first timestamp, and the second timestamp; and
in accordance with a determination that the average speed is higher than a threshold speed, determining whether the first user of the first mobile device is browsing the displayed map;
wherein the displayed map is updated on the user interface of the first mobile device in accordance with a determination that the first user is not browsing the displayed map.

14. The mobile device of claim 13, wherein the first and second geographic location information includes GPS coordinates where the first and second mobile devices are located at the first timestamp, respectively, and the GPS coordinates are measured by a respective internal GPS embedded in the first and second mobile devices.

15. The mobile device of claim 13, wherein the first geographic location information includes latitude and longitude values associated with the first location of the first mobile device, and the second geographic location information includes latitude and longitude values associated with the second location of the second mobile device.

16. The mobile device of claim 13, wherein the average speed of the mobile device is calculated by dividing a distance between the first geographic location and the updated geographic location information of the first mobile device by a time variation of the first and second timestamps.

17. The mobile device of claim 13, wherein the instant messages exchanged between the first and second users include at least one of a voice message, a text message, a picture, a video clip and an information link.

18. A non-transitory computer-readable medium, having instructions stored thereon, which when executed by one or more processors cause the processors to perform operations comprising:
at a first mobile device and while executing an instant messaging application:
obtaining first geographic location information of the first mobile device associated with a first user, second geographic location information of a second mobile device associated with a second user, and a first timestamp at which both the first and second geographic location information is recorded;
displaying a map associated with the first timestamp on a user interface, wherein the map includes a first mark corresponding to the first mobile device at a first location defined by the first geographic location information and a second mark corresponding to the second mobile device at a second location defined by the second geographic location information, respectively;
displaying two instant messages exchanged between the first and second users on top of the map displayed in the user interface, further including: displaying a first user message sent by the first mobile device adjacent to the first mark and displaying a second user message sent by the second mobile device adjacent to the second mark;
obtaining updated geographic location information of the first mobile device and the second mobile device, and a second timestamp at which the updated geographic location information of the first mobile device and the second mobile device is recorded;

updating the displayed map on the user interface to reflect variations of the geographic locations of the first and second mobile devices, wherein the first mark corresponding to the first mobile device is at a fixed location on the user interface, and the second mark corresponding to the second mobile device is updated on the displayed map according to the updated geographic location information of the second mobile device;

calculating an average speed of the first mobile device based on the first geographic location information, the updated geographic location information of the first mobile device, the first timestamp, and the second timestamp; and in accordance with a determination that the average speed is higher than a threshold speed, determining whether the first user of the first mobile device is browsing the displayed map;

wherein the displayed map is updated on the user interface of the first mobile device in accordance with a determination that the first user is not browsing the displayed map.

\* \* \* \* \*